US012620147B2

(12) United States Patent
Wu Won et al.

(10) Patent No.: US 12,620,147 B2
(45) Date of Patent: May 5, 2026

(54) SYSTEMS AND METHODS FOR RECOGNIZING HAND-DRAWN SHAPES

(71) Applicant: Canva Pty Ltd, Surry Hills (AU)

(72) Inventors: Kevin Andrew Wu Won, Sydney (AU); Kerry Jayne Halupka, Kensington (AU); Rowan James Katekar, Randwick (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/770,027

(22) Filed: Jul. 11, 2024

(65) Prior Publication Data

US 2024/0362839 A1      Oct. 31, 2024

Related U.S. Application Data

(63) Continuation of application No. 18/599,906, filed on Mar. 8, 2024.

(30) Foreign Application Priority Data

Mar. 13, 2023    (AU) ................................. 2023201533

(51) Int. Cl.
*G06T 11/23*          (2026.01)
*G06T 3/02*           (2024.01)
*G06T 7/30*           (2017.01)

(52) U.S. Cl.
CPC ................ *G06T 11/23* (2026.01); *G06T 3/02* (2024.01); *G06T 7/30* (2017.01)

(58) Field of Classification Search
None
See application file for complete search history.

(56) References Cited

U.S. PATENT DOCUMENTS

| | | | |
|---|---|---|---|
| 6,094,506 A | 7/2000 | Hullender | |
| 6,275,611 B1 * | 8/2001 | Parthasarathy ...... G06V 30/373 |
| | | | 382/187 |
| 9,274,693 B2 | 3/2016 | Moore et al. | |
| 10,133,949 B2 | 11/2018 | Taranta et al. | |
| 10,168,899 B1 | 1/2019 | Feiszli et al. | |
| 10,372,321 B2 | 8/2019 | Le et al. | |

(Continued)

FOREIGN PATENT DOCUMENTS

WO          2022083844 A1      4/2022

OTHER PUBLICATIONS

Examination Report No. 1 for Australian Application No. 2023201533 mailed May 30, 2023, pp. 1-5.

(Continued)

*Primary Examiner* — Jeffrey J Chow
(74) *Attorney, Agent, or Firm* — GrowIP Law Group LLC

(57) ABSTRACT

Described herein is a computer implemented method. The method includes receiving, via an input device, first user input drawing an input shape and generating, based on the first user input, original drawing data that includes an ordered set of points that define the input shape. The original drawing is processed to generate an input vector which also includes an ordered set of points. The input shape is then classified as a first template shape by processing the input vector using a machine learning model. A new shape is then generated based on the first template shape and the original drawing data.

20 Claims, 8 Drawing Sheets

(56) References Cited

U.S. PATENT DOCUMENTS

| | | | |
|---|---|---|---|
| 10,885,683 B1 | 1/2021 | Batra et al. | |
| 11,037,341 B1 | 6/2021 | Gori et al. | |
| 11,188,223 B2 | 11/2021 | Angelov et al. | |
| 2002/0037105 A1* | 3/2002 | Michael | G06F 18/24323 |
| | | | 382/203 |
| 2004/0247182 A1* | 12/2004 | Wenzel | G06V 10/42 |
| | | | 382/209 |
| 2005/0015250 A1 | 1/2005 | Davis | |
| 2008/0144942 A1* | 6/2008 | Besley | G06V 30/413 |
| | | | 382/209 |
| 2011/0141301 A1 | 6/2011 | Raghoebardajal et al. | |
| 2012/0230586 A1 | 9/2012 | Blennerhassett | |
| 2014/0104201 A1* | 4/2014 | Tsutsui | G06F 3/04883 |
| | | | 345/173 |
| 2015/0199583 A1* | 7/2015 | Nagatomo | G06F 18/2113 |
| | | | 382/145 |
| 2017/0061636 A1* | 3/2017 | Nordback | G06V 10/476 |
| 2021/0225180 A1* | 7/2021 | S | B64D 43/00 |
| 2021/0278965 A1 | 9/2021 | Mélinand et al. | |
| 2023/0131541 A1 | 4/2023 | Boezaart et al. | |
| 2024/0153298 A1* | 5/2024 | Fang | G06V 30/19173 |

OTHER PUBLICATIONS

Examination Report No. 1 for Australian Application No. 2023201991 mailed Nov. 28, 2023, pp. 1-4.
Examination Report No. 1 for Australian Application No. 2023201983 mailed Oct. 31, 2023, pp. 1-5.
Video transcript generated by YouTube, How to use Quickshape in Procreate, https://www.youtube.com/watch?v=ogP1X6PjRSQ, Published on Jun. 11, 2021, (last visited on internet on Oct. 30, 2023), pp. 1-4.
Ramer-Douglas-Peucker Algorithm Wikipedia Page, https://en.wikipedia.org/w/index.php?title=Ramer-Douglas-Peucker_algorithm&oldid=1107863277 (last visited Sep. 30, 2024), pp. 1-4.
European Search Report for EP24163132 mailed Aug. 8, 2024, pp. 1-8.

* cited by examiner

400

410

500

502 — Receive user input shape an input shape and generate original drawing data 504 — Detect shape recognition trigger event 506 — Generate input vector 508 — Perform data standardisation 510 — Perform data normalisation 512 — Classify input shape 514 — Template shape recognised No Yes 516 — Retain input shape 518 — Generate new shape 520 — Output new shape

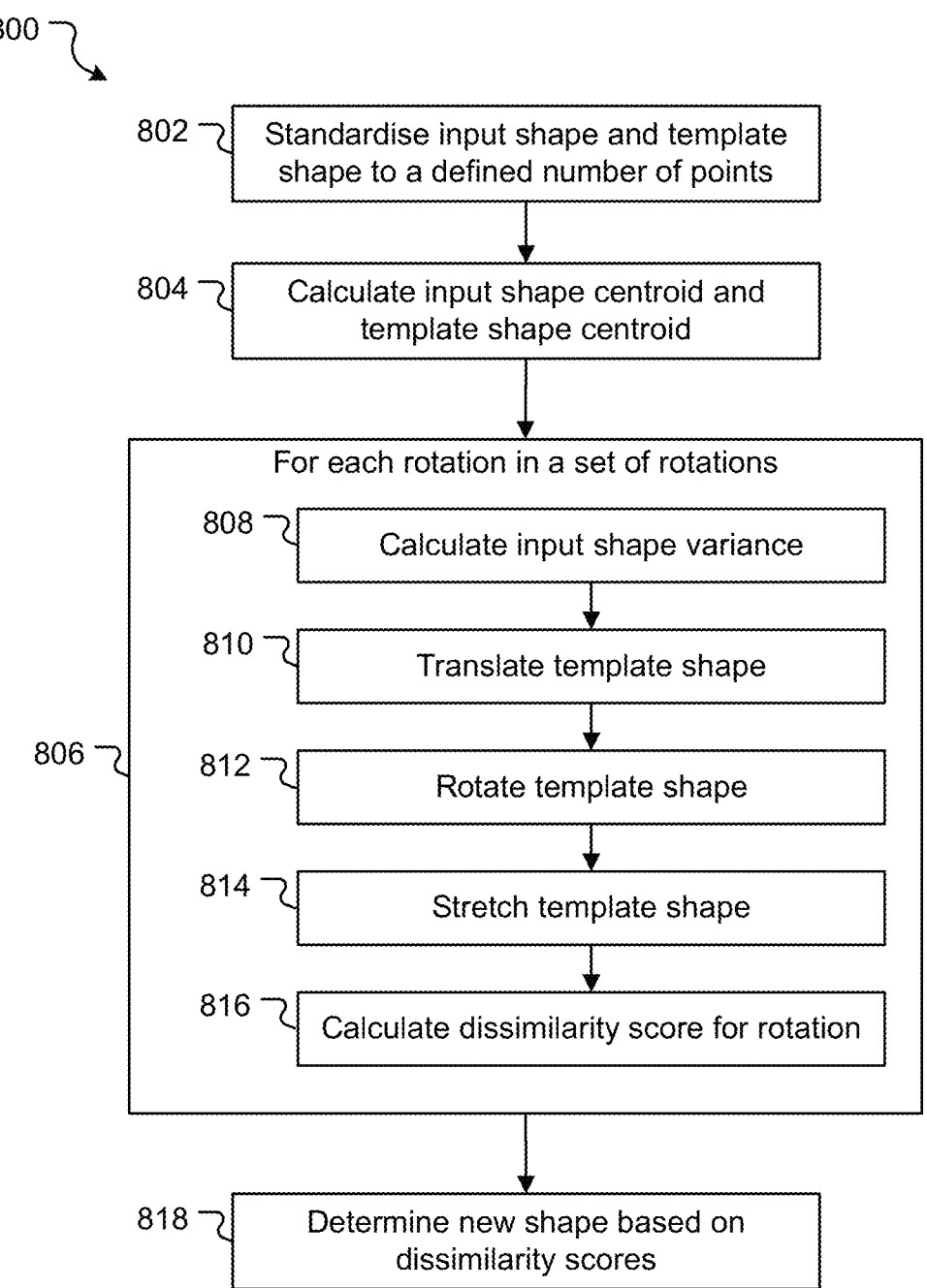

800

802 — Standardise input shape and template shape to a defined number of points

804 — Calculate input shape centroid and template shape centroid

806 — For each rotation in a set of rotations

808 — Calculate input shape variance

810 — Translate template shape

812 — Rotate template shape

814 — Stretch template shape

816 — Calculate dissimilarity score for rotation

818 — Determine new shape based on dissimilarity scores

902   Retrieve original training example

904   Generate synthetic training examples based on original training example

906   Generate horizontally flipped s. shape

908   Generate vertically flipped s. shape

910   Generate one or more point-order rotated s. shapes

912   Generate one or more jittered s. shapes

914   Generate reversed s. shape

916   Generate one or more spatially rotated s. shapes

1002   *Star*

1000

1004

SYSTEMS AND METHODS FOR RECOGNIZING HAND-DRAWN SHAPES

CROSS-REFERENCE TO RELATED APPLICATIONS

This application is a Continuation application of U.S. Non-Provisional application Ser. No. 18/599,906, filed on Mar. 8, 2024, that claims priority to Australian Patent Application No. 2023201533, filed on Mar. 13, 2023, that are each hereby incorporated by reference in their entirety.

TECHNICAL FIELD

The present disclosure is directed to systems and methods for recognising hand-drawn shapes.

BACKGROUND

Various computer applications for creating and publishing digital designs exist. Generally speaking, such applications allow users to create a design by, for example, creating a page and adding design elements to that page.

In order to add design elements to a page a design application may provide various tools. For example, a design application may provide a draw tool which allows a user to create a design element by drawing it on the page (using, for example, a cursor control or touch input device).

In certain instances, a user may use such a draw tool to try and draw geometric shapes e.g. circles, rectangles, arrows, stars, and/or other shapes. Where a draw tool is used to draw such a shape, however, the shape as drawn will almost always be imperfect due to the imprecision of the drawing input. Various imperfections in a shape drawn using a drawing tool may arise, for example lines that are intended to be horizontal or vertical (or parallel to other lines in the drawn shape) will not be quite horizontal/vertical/parallel, curves that are intended to be of a constant radius will not be, angles between shape segments that are supposed to be 90 degrees (or complementary to other angles in the drawn shape) will not be.

SUMMARY

Described herein is a computer implemented method including: receiving, via an input device, first user input drawing an input shape; generating, based on the first user input, original drawing data, the original drawing data including an ordered set of points that define the input shape; processing the original drawing data to generate an input vector, the input vector including an ordered set of points; and classifying the input shape into a first class that corresponds to a first template shape by processing the input vector using a machine learning model; generating a new shape based on the first template shape and the original drawing data; and outputting the new shape.

BRIEF DESCRIPTION OF THE DRAWINGS

In the drawings:

FIG. 8 is a flowchart depicting operations performed in an example method for generating a new shape based on a template shape and an input shape.

Figure 1:
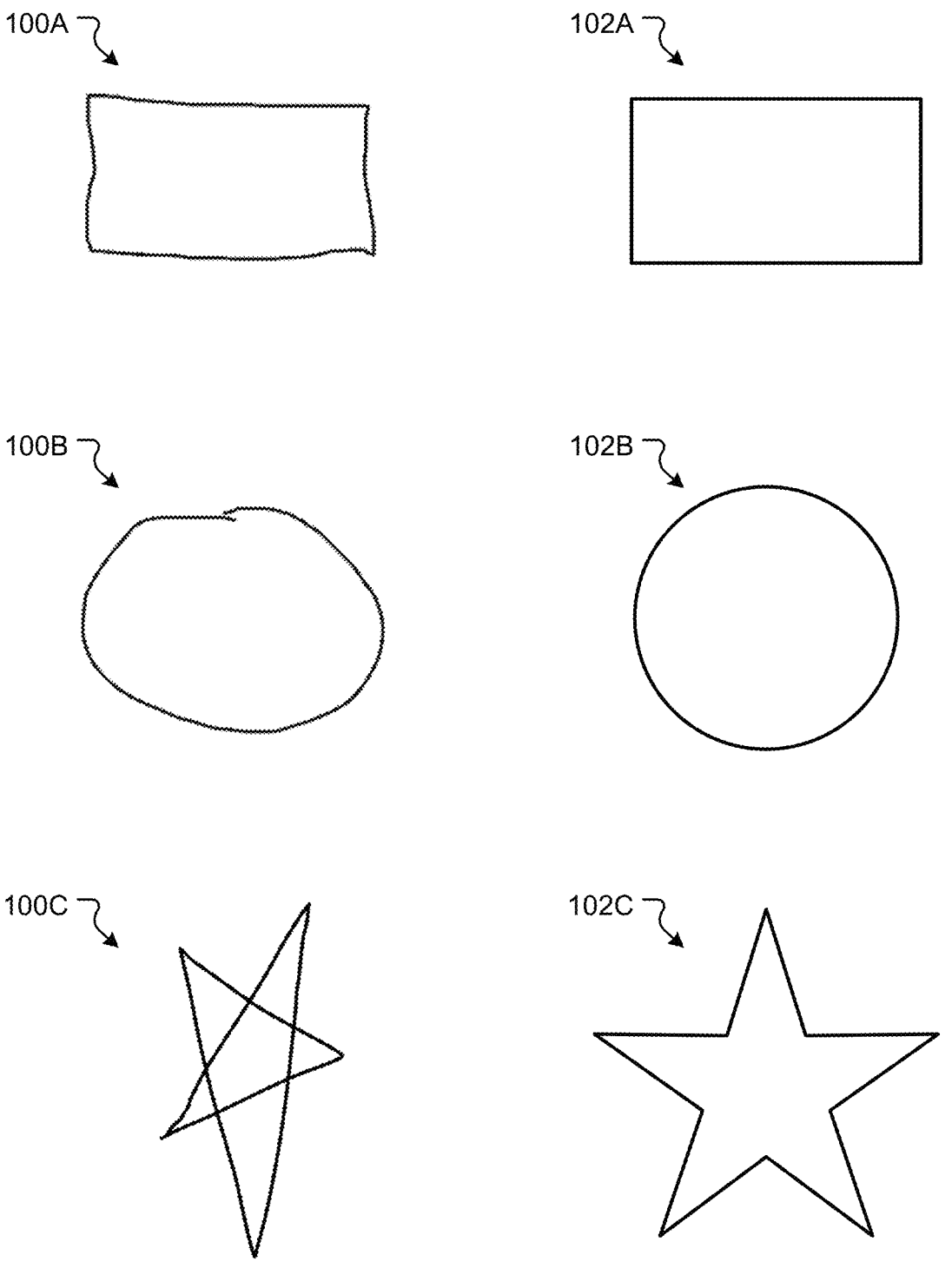
FIG. 1 depicts example hand drawn shapes and corresponding template shapes.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As discussed above, design applications for use in creating designs are known. As also discussed above, one type of tool such applications may provide is a draw tool.

In the context of the present specification, a draw tool is a tool that allows a user to draw a path using an input device—e.g. to draw a path using a mouse or other cursor control device or to draw a path on a touch screen. Based on the input, the application renders the path drawn on a display and generates an ordered set of points (e.g. coordinate pairs) that describe the path. A draw tool such as this may be known as a pen tool, a freehand drawing tool, a freeform drawing tool, or other names.

In the context of the present specification, a shape drawn using a draw tool will be referred to as a hand-drawn shape.

An advantage of a draw tool is the freedom a user has to draw whatever they would like. In some instances, however, this freedom can be problematic—for example where a user wishes to draw a precise geometric shape.

To illustrate this, FIG. 1 provides three examples of shapes that have been drawn using a draw tool (i.e. hand-drawn shapes 100): 100A is a hand-drawn rectangle; 100B is a hand-drawn circle; and 100C is a hand-drawn star. FIG. 1 also provides three examples of template shapes 102: 102A is a template rectangle; 102B is a template circle; and 100C is a template star. As will be appreciated, a user who draws one of these hand-drawn shapes 100 may actually be intending to draw a more precise version of that shape—e.g. the corresponding template shape 102.

The present disclosure describes techniques for recognising hand-drawn shapes—e.g. for processing a hand-drawn shape to determine whether it corresponds to an existing template shape. If a corresponding template shape is identified, that shape can, for example, be suggested to the user as a replacement for their hand drawn shape.

Recognising hand-drawn shapes in this manner provides a number of advantages.

For example, in many instances a hand-drawn shape will require more data to describe it than a corresponding template shape. To illustrate this, consider a hand-drawn shape such as 100A that is roughly a rectangle that starts and ends near point (100,100). Such a hand-drawn shape may be described by an ordered set of n points (e.g. point defined by a coordinate pair): e.g. [(97, 99), (150, 90), (180, 105), . . . (290, 90), . . . (310, 200), . . . (110, 210), . . . (90, 90)]. The number of points defining the shape will depend on various factors, including the time taken to draw the shape, but could easily number in the hundreds. In contrast, a corresponding template shape such as 102A may be described in various ways that require less data. For example, a template rectangle corresponding to the example hand-drawn rectangle above may be defined by four points indicating the four corners of the rectangle: [(100, 100), (300, 100), (300, 200), (100, 200)]. As an alternative example, a template rectangle corresponding to the example hand-drawn rectangle shape above may be defined as a vector graphic (e.g. scalable vector graphic (SVG))—e.g.: via a <rect> element such <rect width="200" height="100"> (along with additional data defining the rectangle's position) or a path element such as <path d="M100 100 L300 100 L300 200 L100 200 Z"/>.

Even if a design application provides a user with access to template shapes (e.g. via a set of menus or other controls that allow a user to search for and select template shapes), recognising template shapes that correspond to hand-drawn shapes may nonetheless be advantageous. For example, a user may not be aware that the design application they are using provides template shapes or, even if they are aware of this, may not know what specific template shapes are available and/or how to access and those template shapes. Still further, even if a user does know that template shapes are provided, and knows how to access those template shapes, automatically recognising hand-drawn shapes may still be advantageous as it effectively allows the user to add template shapes without having to switch context from the draw tool.

Embodiments of the present disclosure are directed to techniques that can be used to recognise hand-drawn shapes. These techniques described herein are described in the context of a design platform that is configured to facilitate various operations concerned with digital designs. As described further below, other embodiments of the present disclosure are directed to techniques for generating a set of training data that can be used to train a machine learning model to recognise hand-drawn shapes.

A design platform which may take advantage of the hand-drawn shape recognition techniques described herein may take various forms. In the embodiments described herein, the design platform is described as a stand-alone platform (e.g. a single application or set of applications that run on a user's computer processing system and perform the techniques described herein without requiring server-side operations). The hand-drawn shape recognition techniques described herein can, however, be performed (or be adapted to be performed) by a client-server type design platform (e.g. one or more client applications and one or more server applications that interoperate to perform the described techniques).

Figure 2:
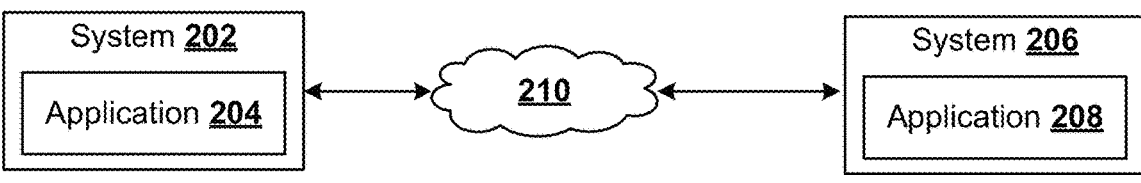
FIG. 2 is a diagram depicting a computing environment in which various features of the present disclosure may be implemented.

FIG. 2 depicts a two computer processing systems 202 and 206 that are configured to perform various functions described herein.

Each computer processing system 202 and 206 may be any suitable type of computer processing system, for example a desktop computer, a laptop computer, a tablet device, a smart phone device, a server computer, or an alternative computer processing system.

In this example, computer system 202 is configured to perform the functions described herein by execution of a software application (or a set of software applications) 204—that is, computer readable instructions that are stored in a storage device (such as non-transitory memory 310 described below) and executed by a processing unit of the system 202 (such as processing unit 302 described below).

In the present example, application 204 (and/or other applications of system 202) facilitate various functions related to digital designs. These may include, for example, design creation, editing, storage, organisation, searching, storage, retrieval, viewing, sharing, publishing, and/or other functions related to digital designs.

In this example, computer system 206 is configured to perform the functions described herein by execution of a software application (or a set of software applications) 208—that is, computer readable instructions that are stored in a storage device (such as non-transitory memory 310 described below) and executed by a processing unit of the system 206 (such as processing unit 302 described below).

In the present example, application 208 (and/or other applications of system 206) facilitate various functions related to creating and training a machine learning model for recognising hand-drawn shapes.

In the example of FIG. 2, systems 202 and 206 are connected to a communications network 210. Via network 210 system 202 can communicate with (e.g. send data to and receive data from) other computer processing systems (not shown). The techniques described herein do not, however, require network connectivity between systems 204 and 206.

In FIG. 2, systems 202 and 206 are each depicted as having/executing a single application 204 and 208. However, each system 202 and 204 may (and typically will) include additional applications (not shown). For example, and assuming applications 204 and 208 are not part of operating system applications, system 202 and 206 will each include a separate operating system application (or group of applications).

The techniques and operations described herein are performed by one or more computer processing systems.

Figure 3:
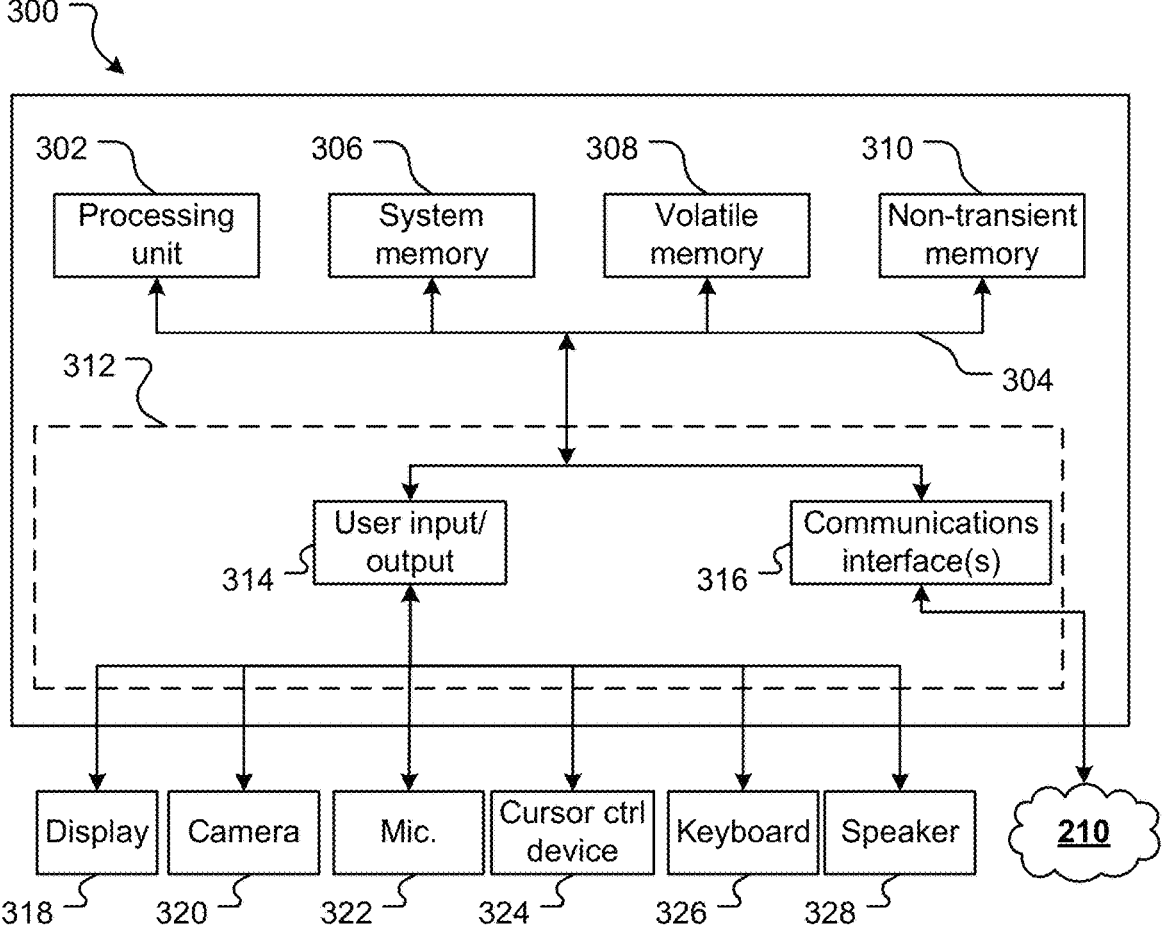
FIG. 3 is a block diagram of a computer processing system configurable to perform various features of the present disclosure.

Turning to FIG. 3, a block diagram depicting hardware component of a computer processing system 300 is provided. Each computer processing system 202 and 206 of FIG. 2 may be a computer processing system such as 300 (though alternative hardware architectures are possible).

Computer processing system 300 includes at least one processing unit 302. The processing unit 302 may be a single computer processing device (e.g. a central processing unit, graphics processing unit, or other computational device), or may include a plurality of computer processing devices. In some instances, where a computer processing system 300 is described as performing an operation or function all processing required to perform that operation or function will be performed by processing unit 302. In other instances, processing required to perform that operation or function may also be performed by remote processing devices accessible to and useable by (either in a shared or dedicated manner) system 300.

Through a communications bus 304 the processing unit 302 is in data communication with a one or more machine readable storage devices (also referred to as memory devices). Computer readable instructions and/or data which are executed by the processing unit 302 to control operation of the processing system 300 are stored on one more such storage devices. In this example system 300 includes a system memory 306 (e.g. a BIOS), volatile memory 308 (e.g. random access memory such as one or more DRAM modules), and non-transitory memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Generally speaking, and depending on the particular system in question, devices to which system 300 connects—whether by wired or wireless means—include one or more input devices to allow data to be input into/received by system 300 and one or more output device to allow data to be output by system 300.

By way of example, where system 300 is a personal computing device such as a desktop or laptop device, it may include a display 318 (which may be a touch screen display and as such operate as both an input and output device), a camera device 320, a microphone device 322 (which may be integrated with the camera device), a cursor control device 324 (e.g. a mouse, trackpad, or other cursor control device), a keyboard 326, and a speaker device 328.

As another example, where system 300 is a portable personal computing device such as a smart phone or tablet it may include a touchscreen display 318, a camera device 320, a microphone device 322, and a speaker device 328.

As another example, where system 300 is a server computing device it may be remotely operable from another computing device via a communication network. Such a server may not itself need/require further peripherals such as a display, keyboard, cursor control device etc. (though may nonetheless be connectable to such devices via appropriate ports).

Alternative types of computer processing systems, with additional/alternative input and output devices, are possible.

System 300 also includes one or more communications interfaces 316 for communication with a network, such as network 210 of FIG. 1. Via the communications interface(s) 316, system 300 can communicate data to and receive data from networked systems and/or devices.

System 300 stores or has access to computer applications (also referred to as software or programs)—i.e. computer readable instructions and data which, when executed by the processing unit 302, configure system 300 to receive, process, and output data. Instructions and data can be stored on non-transitory machine readable medium such as 310 accessible to system 300. Instructions and data may be transmitted to/received by system 300 via a data signal in a transmission channel enabled (for example) by a wired or wireless network connection over an interface such as communications interface 316.

Typically, one application accessible to system 300 will be an operating system application. In addition, system 300 will store or have access to applications which, when executed by the processing unit 302, configure system 300 to perform various computer-implemented processing operations described herein. For example, in FIG. 1 computer processing system 202 (which may be or include the hardware components of computer processing system 300) includes and executes application 204 and computer processing system 206 (which may be or include the hardware components of computer processing system 300) includes and executes application 208.

In some cases part or all of a given computer-implemented method will be performed by system 300 itself, while in other cases processing may be performed by other devices in data communication with system 300.

It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Figure 4:
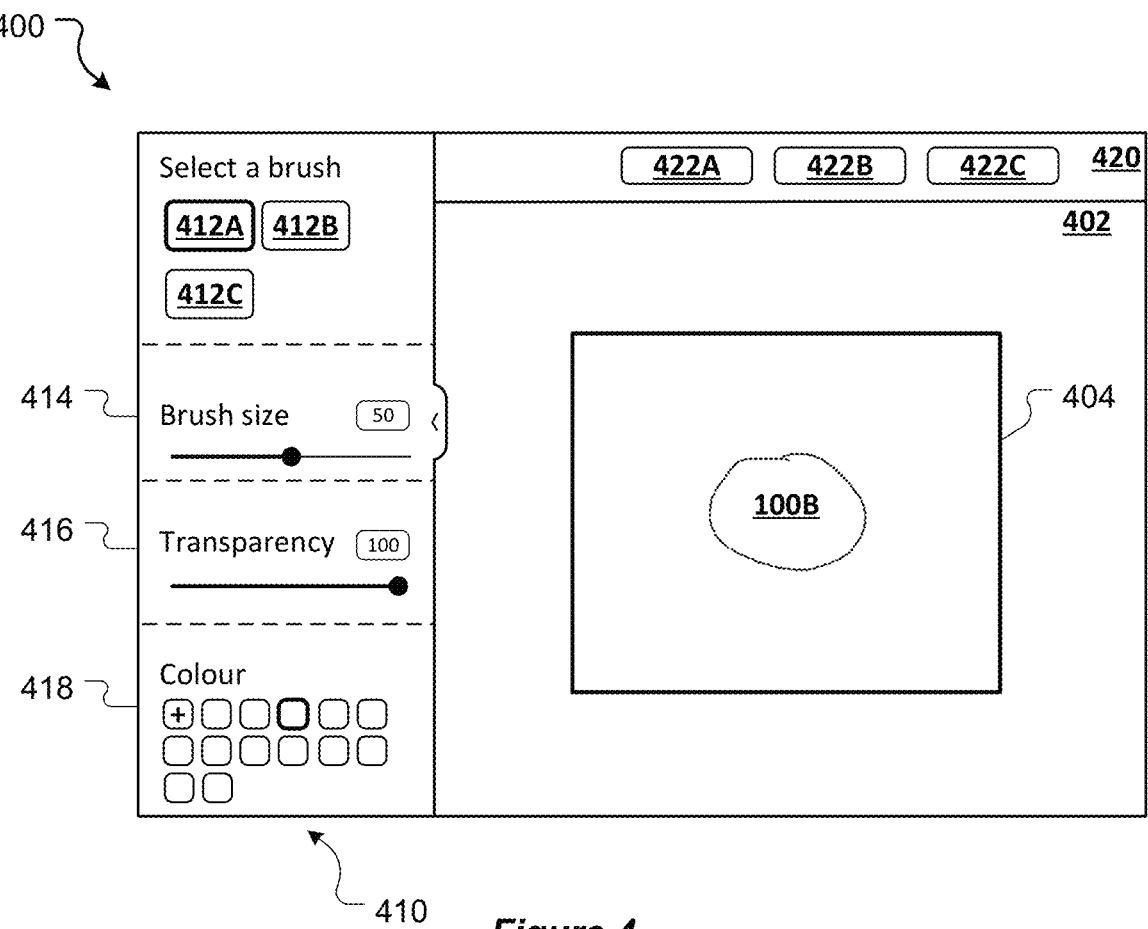
FIG. 4 depicts an example user interface.

In the present disclosure, application 204 configures the client system to provide an editor user interface 400 (UI). Generally speaking, UI 400 will allow a user to create, edit, and output designs. FIG. 4 provides a simplified and partial example of an editor UI. In this example the editor UI 400 is a graphical user interface (GUI).

Editor UI 400 includes a design preview area 402. Design preview area 402 may, for example, be used to display a page 404 (or, in some cases multiple pages) of a design that is being created and/or edited. In this example, preview area 402 displays a page 404 on which a user has drawn the hand-drawn circle shape 100B of FIG. 1.

Editor UI 400 also includes a design tools area 410. In this example the design tools area is used to display a set of drawing tools which include: one or more draw tool selectors 412, a brush size selection interface 414 (with controls allowing a user to adjust the brush stroke size), a transparency interface 416 (with controls allowing a user to adjust the brush stroke transparency), and a colour selection interface (with controls allowing a user to adjust the brush stroke colour). In this example, three separate draw tool selectors are provided (412A, 412B, and 412C). These may correspond to different brush types—e.g. a pen brush type, a marker brush type, a highlighter brush type, and/or other brush types.

GUI 400 also includes an additional controls area 420 which is used to display additional controls 422. The additional controls may include one or more: permanent controls (e.g. controls such as save, download, print, share, publish, and/or other controls that are frequently used/widely applicable and that application 204 is configured to permanently display); user configurable controls (which a user can select to add to or remove from area 420); and/or one or more adaptive controls (which application 204 may change depending, for example, on the type of design element that is currently selected/being interacted with by a user). For example, if a text element is selected, application 204 may display adaptive controls such as font style, type, size, position/justification, and/or other font related controls may be displayed. Alternatively, if a vector graphic element is selected, application 204 may display adaptive controls such as fill attributes, line attributes, transparency, and/or other vector graphic related controls may be displayed.

As one example, an additional control 422A may be a drawing tool control which, when selected, causes a set of drawing tools such as that shown in design tools area 410 to be displayed.

Once a design has been created, application 204 may provide various options for outputting that design. For example, application 204 may provide a user with options to output a design by one or more of: saving the design to local memory of system 202 (e.g. non-transitory memory 310); saving the design to remotely accessible memory device; uploading the design to a server system; printing the design to a printer (local or networked); communicating the design to another user (e.g. by email, instant message, or other electronic communication channel); publishing the design to a social media platform or other service (e.g. by sending the design to a third party server system with appropriate API commands to publish the design); and/or by other output means.

In the present disclosure application 204 has access to a set of template shapes. The set of template shapes includes at least two template shapes, though will typically include more template shapes.

By way of example, in certain implementations application 204 may be configured with a set of template shapes that includes: a rectangle; a cloud; a speech bubble; an arrow; a tick; a triangle; a circle; a star shape (e.g. a 5 pointed star); a line shape; a heart shape; a diamond shape; a hexagon shape. Application 204 may be configured with fewer template shapes, additional template shapes, and/or alternative template shapes.

Each template shape is described by template shape data. Various formats for template shape data are possible. In the examples described herein, each template shape is described by a vector graphic description—e.g. data describing a SVG path.

In the examples described herein, a Cartesian coordinate system is used in which x (horizontal) coordinates increase from left to right and y (vertical) coordinates increase from top to bottom. In this coordinate system, the position (x=0, y=0) for a given design page is the top left corner of the page.

In light of this coordinate system, reference herein to point in this specification is reference to x-coordinate, y-co-ordinate pair.

The techniques described herein can be adapted for alternative coordinate systems.

Figure 5:
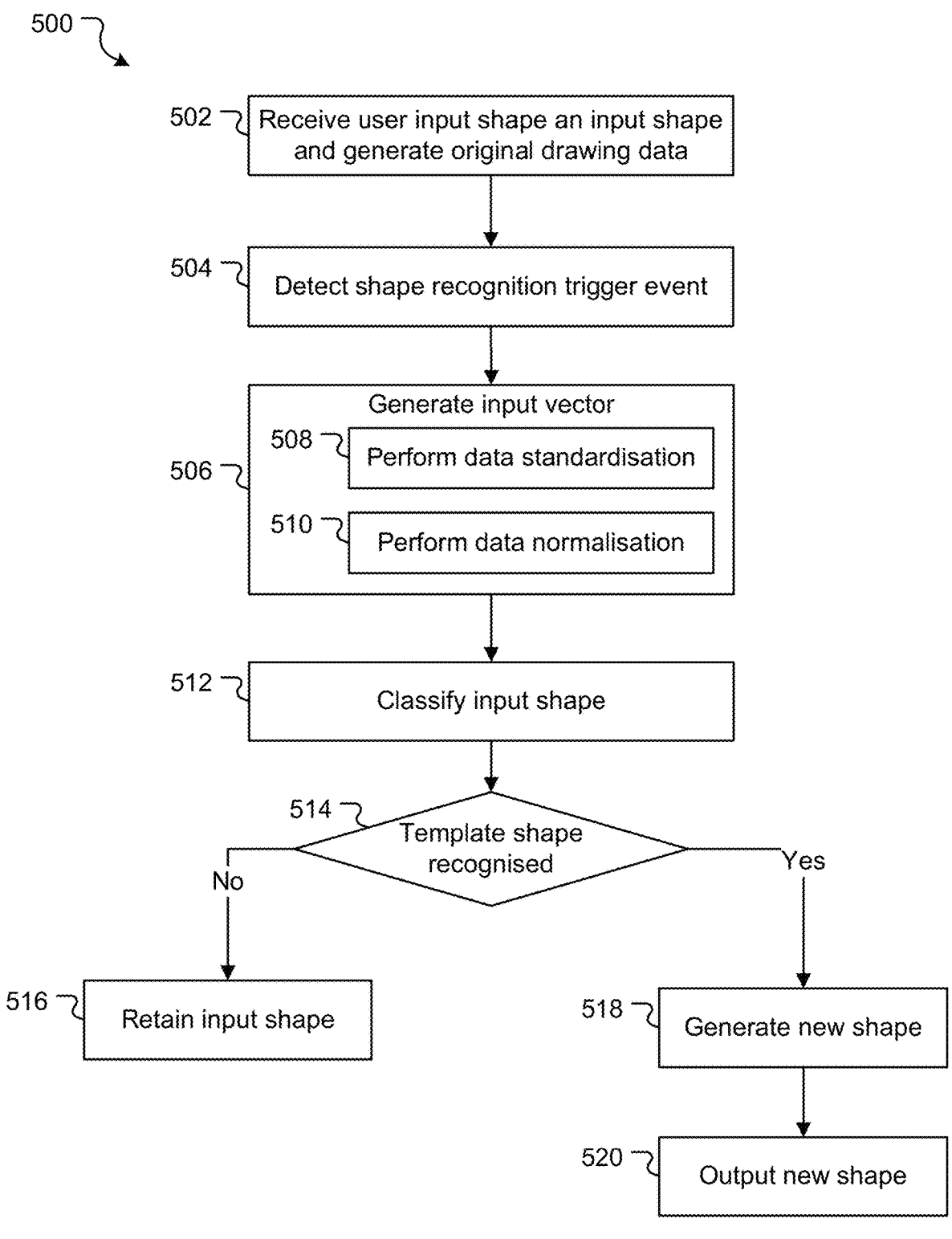
FIG. 5 is a flowchart depicting operations performed in a method for recognising an input shape.

Turning to FIG. 5, a computer implemented method 500 for automatically recognising an input shape (e.g. a hand-drawn shape that is drawn using a draw tool) will be described. The operations of method 500 will be described as being performed by application 204 running on system 202.

At 502, application 204 receives user input that hand-draws a shape and based on that input generates data that describes that shape.

The hand-drawn shape will be referred to as the input shape and the data describing that shape will be referred to as the original drawing data.

The user input may, for example, be received via a cursor control device 324 (such as a mouse, a trackball, a trackpad, or another cursor control device) or a touch sensitive device (such as a touch screen display 318).

In the present examples, the input shape corresponds to a single continuous drawing stroke that is input by the user. For example, and with reference to editor UI 400 described above, if a mouse is used as the input device, an input shape may be drawn by: pressing a mouse button while the cursor is on the page 404, moving the mouse around the page 404 while holding the mouse button, then releasing the mouse button. Alternatively, if a touch sensitive display is used as the input device, such a shape may be drawn by: contacting the display at a position on page 404, moving the contact on the display while maintaining contact, then releasing the contact.

Based on the user input, application 204 generates original drawing data. In the present example, application 204 is configured to generate the original drawing data by recording the position of the user input (e.g. the (x, y) position of the cursor or of the touch input) during the user input at a defined sampling rate. Any appropriate sampling rate may be used, for example 60 Hz. If necessary, the raw positions that are captured are converted to a coordinate space appropriate for the page in question. Each captured position is then added, in order, to a set of points—e.g. an array of coordinate pairs.

At 504, application 204 detects a shape recognition trigger event (referred to a trigger event for convenience). Various trigger events are possible. For example, application 204 may be configured to interpret the completion of user input drawing the input shape as a trigger event (e.g. when the user releases the mouse button or breaks contact with the touch screen display). Alternatively, or in addition, application 204 may be configured to detect a further user interaction with a shape that has been drawn and treat this as a trigger event. Such a further interaction may, for example, be an interaction such as hovering a cursor over or a dwell contact on the hand-drawn shape for a predetermined time period (e.g. 1 second or an alternative time period). Alternatively, or in addition, a trigger event may be user selection of a particular UI control or menu item.

At 506, in response to detecting the shape recognition trigger event, application 204 processes the original drawing data to generate an input vector. The input vector is also an ordered set of points.

In the present embodiment, application 204 processes the original drawing data to generate the input vector by standardising (at 508) and normalising (at 510) the original drawing data.

Generally speaking, standardisation is performed to generate data that describes the input shape (or something approximating the input shape) using a defined number of points. Application 204 may standardise drawing data (whether the original drawing data or normalised data) at 508 in various ways.

In the present embodiment application 204 standardises the original drawing data (to generate standardised drawing data) and then normalises the standardised drawing data to generate the input vector. Application 204 could, however, be configured to first normalise the original drawing data (to generate normalised data) and then standardise the normalised data to generate the input vector.

As described below, the standardised drawing data (or a normalised version thereof) is in due course provided as input to a machine learning model. In the present embodiments, standardising the drawing data serves two purposes. In most cases, standardising the original drawing data will result in a smaller input vector than would otherwise be the case. This improves the time taken to classify the input shape.

A second purpose is that standardising original drawing data so that a constant size input vector is created in all situations such assists the machine learning model generalise input shapes (and, therefore, classify those input shapes against a set of template shapes). As discussed above, original drawing data is generated using a defined sampling rate. A result of this is that two hand drawn shapes that are similar (or even identical) may be described by quite different original drawing data. As one example, and assuming a sampling rate of 60 Hz, if a first user takes 10 seconds to draw a rectangle, original data including 600 points will be generated. If a second user takes 5 seconds to draw the same (or a very similar rectangle), original data including 300 points will be generated-even though the shape is the same (or similar). By standardising the original drawing data to generate a defined number of points that describe the input shape (or an approximation thereof), the data describing the rectangle that was originally described using 100 coordinate pairs and the data describing the rectangle that was originally described using 50 coordinate pairs both end up being described by standardised drawing data that includes a defined number of coordinate pairs.

Two specific example standardisation methods are described below with reference to FIGS. 6 and 7.

The data generated by the standardisation process may be referred to as standardised drawing data. In the present embodiments, the standardised drawing data is an ordered set of points (e.g. and array of coordinate pairs).

In the present embodiments, application 204 is configured to generate standardised drawing data with a defined number of points set at 25. Application 204 may, however, be configured to generate standardised drawing data with other defined numbers of points.

At 510, application 204 normalises drawing data (whether the original drawing data or standardised drawing data). In the present embodiment, application 204 normalises drawing data so that all x values fall within the range [−1 to 1] and all y values fall within the range [−1 to 1]. Application 204 may do this, for example, by processing each original point (x,y) to generate a corresponding normalised point (x', y') as follows:

$$x' = 2 * \left( (x - minX)/(maxX - minX) \right) - 1$$

$$y' = 2 * \left( (y - minY)/(maxY - minY) \right) - 1$$

where
minX=minimum x value of all x coordinates
minY=minimum y value of all y coordinates
maxX=maximum x value of all x coordinates
maxY=maximum Y value of all y coordinates At 512, application 204 processes the input vector using a machine learning model. This may be referred to as classifying the input shape or recognising the input shape.

The machine learning model is trained to classify the input shape (or the approximation thereof) as defined by the points of the input vector against a set of defined classes. This may also be referred to as recognising the input shape. In the present embodiments, the machine learning model is a recurrent neural network (RNN) and, in particular, a long short-term memory (LSTM) RNN. An example machine learning model and its training is discussed below.

Depending on the machine learning model used, the output generated may differ. Typically, however, the output of the machine learning model will be an output vector of n elements, each of the n elements corresponding to a defined class. In the present embodiments, the defined classes include two or more classes that correspond to template shapes. For example: a first element of the output vector may correspond to a first template shape (e.g. "circle"); a second element of the output vector may correspond to a second template shape (e.g. "cloud"); a third element of the output vector may correspond to a third template shape (e.g. "arrow").

Depending on the machine learning model that is used, an element of the output vector may correspond to the open set—i.e. a class to capture any input that cannot be classified into the other classes.

In certain embodiments, the machine learning model may generate the output vector so that a given element's value is a number between 0 and 1 and indicates a likelihood or probability that the input shape corresponds to the class that element corresponds to.

As an alternative example, the output of the machine learning model may be a one-hot encoded output vector. In this case, the machine learning model will generate the output vector so that one vector element has a value of 1 and all other elements have a value of 0.

At 514, application 204 determines whether a template shape has been recognised or not.

In the present example, where the output vector values are between 0 and 1, application 204 may be configured to determine that a template shape is not recognised if no output vector value is greater than a threshold value (e.g. 0.5 or an alternative threshold). If one or more output vector values is greater than the threshold value, application 204 may be configured to determine that a template shape has been recognised (and in that case the template shape is the shape corresponding to the highest—or equal highest— value). Alternatively, application 204 may be configured such that a template shape is only recognised if the highest output vector value is greater than the threshold value and is at least a predefined distance from the next highest output vector value.

By way of alternative example, if the machine learning model generates a one-hot encoded output vector, application 204 would determine that a template shape is recognised if any output vector value corresponding to a template shape is 1.

In some instances, an output vector element may correspond to a "no recognisable shape" class. In this case application 204 will determine that no template shape is recognised if that vector element is active (e.g. has the highest value or a value of 1).

If no template shape is recognised, processing proceeds to 516. In this case the input shape is retained and no further action is taken.

If a template shape is recognised, processing proceeds to 518. At 518, application 204 generates a new shape (or, more particularly, new shape data) that is based on the template shape that has been recognised and the input shape. Application 204 may be configured to generate a new shape based on the template shape in various ways. One example method for doing so is described below with reference to FIG. 8.

At 520, application 204 outputs the new shape generated at 518. Application 204 may be configured to output the new shape in various ways In one embodiment, application 204 is configured to output the new shape by suggesting the new shape as a replacement to the input shape. For example, application 204 may display the new shape along with one or more user input controls that allows the user to either accept or reject the new shape. In this case, application 204 may display the new shape in various ways. For example, in one embodiment application 204 ceases displaying the input shape and displays the new shape in its place. In another embodiment, application 204 displays the new shape at the same time as displaying the input shape, but in a way that visually distinguishes the new shape from the input shape (e.g. by use of different colours, shading/transparency, flashing the new shape on/off, or in an alternative way).

If user input rejecting the new shape is received (e.g. user input activating a reject UI control), application 204 ceases displaying the new shape, discards the new shape, and (if required) re-displays the input shape. Conversely, if user input accepting the new shape is received (e.g. user input activating an accept UI control), application 204 edits the data defining the design in question so that the data defining the input shape is replaced with the data defining the new shape. If required, application 204 also ceases displaying the input shape.

In another embodiment, application 204 is configured to output the new shape by automatically replacing the input shape with the new shape. This involves editing the data defining the design in question so that the data defining the input shape is replaced with the data defining the new shape. In addition, application 204 updates the relevant user interface so that the input shape is no longer displayed and the new shape is displayed.

At 508 above, application 204 standardises drawing data (e.g. the original drawing data or normalised drawing data). As noted, standardisation in the present context is reference to standardising (to a defined number) the number of points that are used to describe the shape (or a shape that approximates the shape) that is defined buy the input drawing data. Various approaches to standardising drawing data may be adopted.

Figure 6:
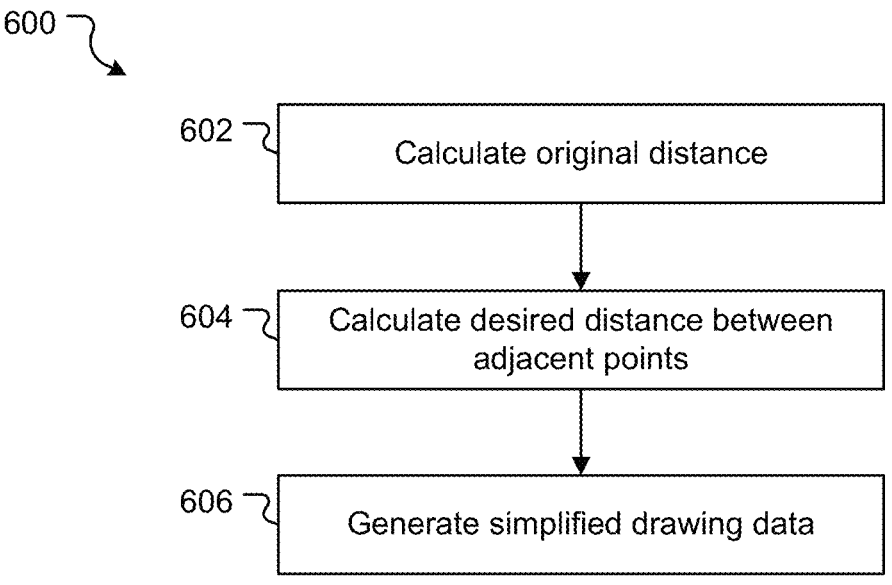
FIG. 6 is a flowchart depicting operations performed in an example method for standardising drawing data to a defined number of points.

In certain embodiments, application 204 is configured to standardise drawing data by a piecewise-linear interpolation method 600 such as that shown in FIG. 6.

Method 600 will be described as being performed on input drawing data (in this case an ordered set of points). This may, for example, be original drawing data or a normalised version thereof. Furthermore, method 600 is performed with reference to a defined number of points N; that is, the number of points that the standardised drawing data is to include. In the present example, the defined number of points is 25, however alternative values can be defined.

At 602, application 204 calculates an original distance that is defined by the input drawing data. Application 204 may do this, for example, by: calculating the straight line distances between each pair of adjacent points in the input drawing data (e.g. the distance between points 1 and 2, the distance between points 2 and 3, . . . , the distance between points n−1 and n); and summing those straight line distances. The straight line distance d between two points $(x_1,y_1)$ and $(x_2,y_2)$ may be calculated as: $d=\sqrt{(x_2-x_1)^2+(y_2-y_1)^2}$.

At 604, application 204 calculates a desired distance between adjacent points. The desired distance is calculated based on the original distance and the defined number of points. Specifically, the desired distance is calculated as (original distance/(defined number of points−1)).

At 606, application 204 generates a new set of points (the standardised drawing data) based on the original drawing data and the desired distance calculated at 604. To do so, application 204 divides the entire line defined by the original drawing data into lengths equal to the desired distance calculated at 604, placing a new point at each division.

Figure 7:
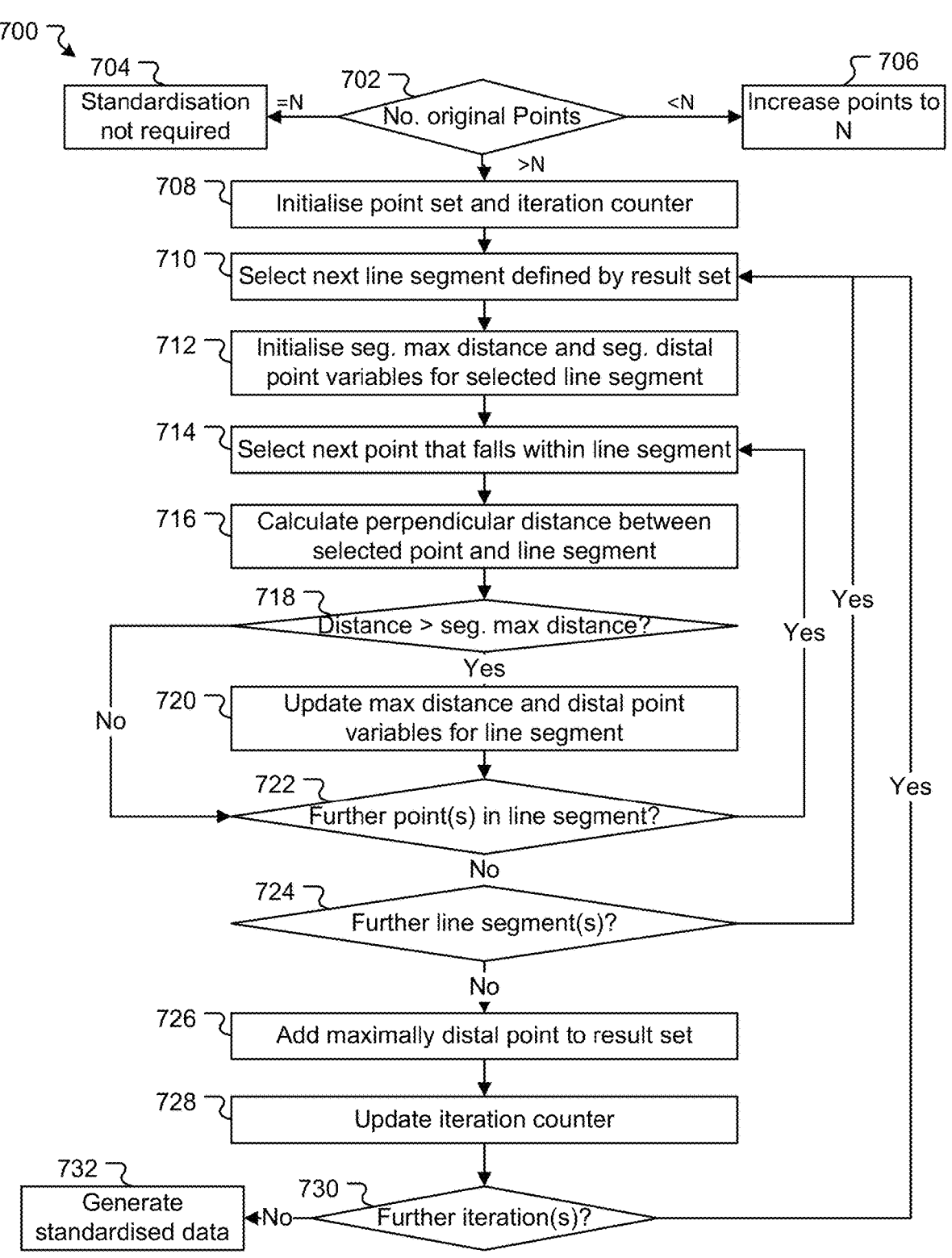
FIG. 7 is a flowchart depicting operations performed in an alternative example method for standardising drawing data to a defined number of points.

As an alternative example, application 204 may standardise drawing data by a line standardisation method 700 as shown in FIG. 7.

Line standardisation method 700 will be described as being performed on the original drawing data (in this case an array (or other ordered set) of points), however method 700 could be performed on other drawing data (e.g. normalised drawing data). Furthermore, method 700 is performed with reference to a defined number of points N (that is, the number of points that the standardised drawing data is to include). In the present example, the defined number of points is 25, however alternative values can be defined.

At 702, application 204 determines if the number of points defined by the original drawing data is less than, equal to, or greater than the defined number of points.

If the number of points defined by the original drawing data is equal to the defined number of points, processing proceeds to 704. In this case no standardisation is required, and application 204 may return the original drawing data (or a value indicating that no standardisation is needed).

If the number of points defined by the original drawing data is less than the defined number of points, processing proceeds to 706. In this case, application 204 uses a piecewise linear interpolation process (e.g. similar to or the same as method 600 described above) to generate standardised drawing data that has the defined number of points. In this case, the standardisation process serves to increase the number of points that are used to describe the input shape.

If the number of points defined by the original drawing data is greater than the defined number of points, processing proceeds to 708. In this case, application 204 performs processing to reduce the number of points that are used to describe the input shape to the defined number of points.

At 708, application 204 initialises data. In the present example, application 204 initialises an result set (e.g. a stack of other ordered data type may be used) that will be used to record original drawing data points that will, in due course, be included in the standardised drawing data. In the present embodiment application 204 identifies original drawing data points in the result set by recording index values (e.g. a value n, where n is the index of an original drawing data point). Alternatively, original drawing data points could be identified in the result set by recording the actual points themselves (e.g. the coordinate pairs). The result set is initialised to identify the first and last original drawing data points—in this example by including the indices of those points. E.g. if the original drawing data is an array defining 100 points, the result set will be initialised to include (in order) (0, 99) (corresponding respectively to indices of the first and lasts points in the original drawing data array). Application 204 also initialises an iteration counter (i), e.g. to 0.

By way of overview, operations 710 to 728 involve N−2 top level iterations. At each top iteration an original drawing data point is identified (which will be referred to as the maximally distal point) and added to the result set.

Each top level iteration involves iterating over each line segment defined by the result set to determine a distal point for that line segment. The distal point for a given line segment is the original drawing data point that falls within in the line segment and that is the most distant from a straight line defined by that line segment.

Once all line segments have been processed in a given top level iteration, the maximally distal point is determined (i.e. the line segment distal point that has the maximum distance) and added to the result set.

Example processing to perform these operations will now be described.

At 710, application 204 selects the next unprocessed line segment defined by the result set. A line segment is defined by two adjacent indices in the result set (or, more specifically, the original drawing data points those indices correspond to). On the initial top level iteration, the result set defines a single line segment (i.e. the line segment between the first and last points of the original drawing data). In subsequent iterations, the result set will define additional indices and, therefore, additional line segments.

At 712, application 204 initialises a segment maximum distance variable (e.g. to 0) and a segment distal point variable (e.g. to −1 or an alternative default value).

At 714, application 204 selects the next original drawing data point that falls within the line segment being processed (i.e. the line segment selected at 710). In this context, an original drawing data point falls within a line segment if its index falls between the indices of the points defining the line segment. E.g. if the line segment is defined by indices 1 and 5, then the original drawing data points at indices 2, 3, and 4 fall within that line segment.

At 716, application 204 calculates the perpendicular distance between the current original drawing data point (selected at 714) and a straight line defined by the current line segment (selected at 710—e.g. a straight line drawn between the two points that define the segment).

At 718, application 204 determines if the distance calculated at 716 is greater than the distance currently recorded in the segment maximum distance variable. If so, processing proceeds to 720 where application 204: updates the currently recorded segment maximum distance with the distance calculated at 716; and updates the segment distal point variable with the index of the current original drawing data point (as selected at 714). Processing then proceeds to 722.

If the distance calculated at 716 is not greater than the distance currently recorded in the maximum distance variable, processing proceeds to 722 without updating the max distance or distal point variable.

At 722, application 204 determines whether there are any unprocessed points that fall within the current line segment. If so, processing returns to 714 to select the next point falling within the current line segment. If not, processing proceeds to 724.

At 724, all points falling within the currently selected line segment have been processed. Application 204 then determines whether there are any unprocessed line segments defined by result set. If so, processing returns to 710 to select the next line segment defined by the result set. If not, processing proceeds to 726.

At 726, all line segments defined by the result set (in its currents state) have been processed. At this point, application will have determined a segment maximum distance and the corresponding segment distal point (i.e. the point that defines the segment maximum distance) for each line segment defined by the result set. At 726, application 204 determines a maximally distal point and adds the index of that point to the result set. The maximally distal point is the (or a) point associated with the greatest (or equal greatest) segment maximum distance. The index of the maximally distal point is added to the result set in sorted order. For example, if the result set includes indices (1,6,9) and the distal point index to be added is 3, it is inserted into the result set between indices 1 and 6, creating an result set of (1,3,6,9).

At 728, application 204 updates the iteration counter (e.g. i=i+1). This completes the current top level iteration.

At 730, application 204 determines whether any further top level iterations are required. In the present example, further iterations will be required if the value of the iteration counter (i) is less than the defined number of points (N)

minus 2. If a further top level iteration is required, processing returns to 710. If no further iteration is required, processing proceeds to 732.

At 732, application 204 generates standardised drawing data based on the indices recorded in the result set. Specifically, the standardised drawing data includes the original drawing data point at each index defined by the result set.

At 518 of method 500, application 204 generates a new shape that is based on the template shape that has been recognised at 512 and the input shape. An example method 800 for generating a new shape will be described with reference to FIG. 8.

At 802, application 204 standardises the input shape (as defined by the original drawing data) and the template shape (as defined by the template shape data of the template shape recognised at 512) so each is described by a defined number of points.

In the present embodiment, both the input shape and the template shape are standardised to 100 equally spaced points along their paths, though an alternative number of points may be used.

Application 204 may standardise the input shape and/or the template shape in various ways. For example, application 204 may use a piecewise-linear interpolation method similar to (or the same as) method 600 described above, a standardisation method similar to (or the same as) method 700 described above, or an alternative method.

If the template shape is defined as a vector graphic (e.g. as a vector graphic path) rather than an ordered set of points, additional/alternative calculations will be performed to prior to (or as part of) standardising the template shape. This may involve, for example, generating a linear approximation of the template shape.

As one example, and for illustrative purposes, consider a template shape that is defined by a series of cubic Bezier curves. In this case, application 204 may be configured to standardise the template shape by a piecewise linear approximation process as follows. Initially, each curve is represented as a parametric function on/where $0<=t<=1$. Each curve is then converted into a series of linear segments by evaluating the curve at a set of values for 1—e.g. 1=0, 0.01, 0.02, . . . 0.99, 1.0. The resulting points give an intermediate shape consisting only of linear segments, however the points may not be evenly distributed around the perimeter. The set of points can then be processed according to a piecewise-linear interpolation method similar to (or the same as) method 600 described above.

Where necessary to avoid confusion, standardisation of drawing data as performed at 510 may be referred to as a first standardisation (and result in first standardisation original drawing data) and standardisation of the original drawing data as performed at 802 may be referred to as a second standardisation (and result in second standardisation original drawing data).

At 804, application 204 calculates an input shape centroid (being the centroid of the points defined by the input shape as normalised at 802) and a template shape centroid (being the centroid of the points defined by the template shape as normalised at 802).

At 806, application 204 performs a plurality of tests, each test corresponding to a test rotation value. In the present example, application 204 is configured to use test rotation values at 15 degree increments (e.g. test rotation 1=0, test rotation 2=15, test rotation 3=30, . . . test rotation 24=360), though alternative test rotation values may be used.

Generally speaking, for each test application 204 generates one or more test shapes (each test shape being based on the template shape) and for each test shape calculates a dissimilarity score (the dissimilarity score being a measure of dissimilarity between the input shape and the test shape).

At 808, and for a given test rotation value, application 204 calculates an input shape variance—e.g. a vector defining an input shape x-coordinate variance and an input shape y-coordinate variance. The input shape variance is calculated within a coordinate space that is rotated based on the test rotation value. For example, if the test rotation value is 45 degrees, then the x and y axes used when calculating the variance are rotated 45 degrees.

At 810, application 204 translates the template shape. Specifically, application 204 translates the template shape as standardised at 802 so that that template shape centroid equals the input shape centroid.

At 812, and for a particular test rotation value, application 204 rotates the template shape. Specifically, application 204 rotates the template shape as translated at 808 according to the test rotation value.

At 814, and for a particular test rotation value, application 204 stretches the template shape. In particular, application 204 stretches the template shape as rotated at 812 in two orthogonal directions so that the variance of the template shape as stretched matches the input shape variance as calculated at 808. That is, the template shape is stretched so that the x-coordinate variance of the template shape as stretched matches the x-coordinate variance of the input shape and the y-coordinate variance of the template shape as stretched matches the y-coordinate variance of the input shape. The two orthogonal directions match the axes of the coordinate space as rotated according to the test rotation value (as described above).

At 816 and for a particular test rotation, application 204 calculates a dissimilarity score. The dissimilarity score is a measure of how closely the template shape (as normalised at 802, translated at 808, rotated at 812, and stretched at 814) matches the input shape (as normalised at 802).

In the present embodiments, application 204 may be configured to calculate the dissimilarity score in two different ways. For shapes that are not typically drawn in a way that matches the corresponding template shape (which will be referred to as pointwise shapes), application 204 is configured to calculate what will be referred to as a pointwise dissimilarity score. For shapes that are typically drawn in a way that matches the corresponding template shape (which will be referred to as pairwise shapes), application 204 is configured to calculate what will be referred to as a pairwise dissimilarity score.

To illustrate this, consider star 100C and the corresponding template star 102C: in this case, the way that star 100C has been drawn does not match the template shape 102C. The template star, therefore, is an example of a pointwise shape. Conversely, the way that (say) circle 100B has been drawn does largely match the template shape 102B. The template circle, therefore, is an example of a pairwise shape.

In order to calculate a pointwise dissimilarity score, application 204 matches each point of the test shape (i.e. the template shape as stretched at 814) with the closest (or an equal closest) point of the input shape point as normalised at 802. For each matched (template shape point, input shape point) pair, application 204 calculates the squared distance between the template shape point and the input shape point. The pointwise dissimilarity score is then the sum of the squared distance calculated for each (template shape point, input shape point) pair.

In other words, pointwise dissimilarity (d) may be calculated as:

For each point in template_shape_points:

$$d = d + \text{distance}(\text{point, input\_drawing\_points.closest\_point\_to(point)})\hat{}2$$

where
   input_drawing_points.closest_point_to (point) operates to find point in the
   input_drawing_points that is closest to 'point'.

If the template shape that has been recognised is a pairwise shape, application 204 is configured to calculate a pairwise dissimilarity score at 816.

In order to calculate a pairwise dissimilarity score for a particular rotation, application 204 generates a plurality of test shape variants and calculates a dissimilarity sub-score for each of those variants. The variant that results in the most favourable dissimilarity sub-score (e.g. the minimum or equal minimum sub-score) is then selected for the particular rotation.

In the present embodiments, application 204 is configured to generate two point order reflection variants for each possible point order rotation variant of the test shape (i.e. of the template shape as stretched at 814). In this context, the two point order reflections are an original point order and a reverse a point order, and a point order rotation is a rotation of the stretched template point values. To illustrate this, consider an illustrative example of a test shape defined by three points:
   [P1, P2, P3]

In this case, application would generate and calculate a dissimilarity sub-score for each of the following variants:
   [P1, P2, P3] (variant 1: original)
   [P3, P2, P1] (variant 2: original reflected)
   [P3, P1, P2] (variant 3: point order rotation 1, not reflected)
   [P2, P1, P3] (variant 4: point order rotation 1, reflected)
   [P2, P3, P1] (variant 5: point order rotation 2, not reflected)
   [P1, P3, P2] (variant 6: point order rotation 2, reflected)

In order to calculate a dissimilarity sub-score for a given variant, application 204 calculates the sum of the squared distances between corresponding (variant point, input shape point) pairs. In this case, corresponding variant point/input shape point pairs are determined by the point's position (e.g. array index) in the set of points: the input shape point at index i corresponds to the variant point at index i.

At 818, and once all test rotations have been tested, application 204 determines the new shape based on the dissimilarity scores. Specifically, application 204 determines the new shape to be the test shape with the most favourable (in this case minimum) dissimilarity score.

Where the template shape is a pointwise shape, the new shape will be the template shape as translated at 810, rotated at 812 and stretched at 814 to generate the minimum dissimilarity score.

Where the template shape is a pairwise shape, the new shape will be the template shape as translated at 810, rotated at 812, stretched at 814, and varied (e.g. by point order rotation and/or reflection) at 816 to generate the minimum dissimilarity score.

In addition, application 204 sets other attributes of the new shape is based on corresponding attributes of the input shape. Such attributes may include, for example, the stroke type, weight, colour, and transparency.

At 512 of method 500, application 204 classifies an input shape. The input shape is defined by an input vector, which includes an ordered set of points (coordinate pairs). The input shape is classified using a trained machine learning model.

This section provides an example machine learning model (and its training) that may be used at 512 above.

In the present example, the operations involved in generating the trained machine learning model are performed by application (or set of applications 208) running on more computer processing system 206. Generating the trained machine learning model may be performed by any appropriate computer processing system-including, for example system 202.

In the present embodiments, the machine learning model is a long short-term memory (LSTM) recurrent neural network (RNN). Alternative machine learning models are, however, possible. As one example, the machine learning model could be a series of fully connected layers (e.g. a feedforward neural network) rather than a LSTM.

Various model attributes may be adopted. By way of specific example, a LSTM with the following attributes may be used: an input layer with a size of 25; a single hidden layer with 125 features; an output layer with a size equal to the number of template shapes that are to be classified against.

In one example, an output layer with a size of 12 may be used (the output layer values corresponding respectively to: rectangle; cloud; speech bubble; arrow; tick; triangle; circle; star; line; heart; diamond; hexagon).

In certain implementations the output layer does not include a dedicated "no recognisable shape" class. In this case a softmax may be applied across the output classes.

In alternative implementations, the output layer does include a "no recognisable shape" class, in which case a sigmoid activation function may be applied to each output class defined by the output layer.

Other relevant parameters of the machine learning model may be initialised in various ways that will be apparent to the skilled addressee. The relevant parameters will depend on the machine model that is to be used, however by way of example may include parameters such as decay rate, learning rate, epochs, batch size, and/or any other relevant parameter to the machine learning model. For example, model parameters may be manually determined (e.g. through experimentation) and/or automatically determined (e.g. via a hyperparameter tuning process).

Once the parameters of the LSTM are defined the model is trained using a training dataset. The training dataset includes a number of training examples. Each training example includes an input shape that is defined by a set of points (e.g. a set of coordinate pairs) and is associated with a known template shape. An example method for generating a training dataset is described below.

Generally speaking, and as will be known to skilled addressees, training the machine learning model involves initialising parameters of the machine learning model (e.g. weights and biases, which may be initialised to 0 or other random values) and processing each training example in the set of training examples to classify the input shape of the training example as one of the known template shapes (or, if a "no recognisable shape" class is provided, as none of the known template shapes).

Processing a given training example during training of the model involves the same (or similar) operations to those performed when recognising an input image as described above with reference to FIG. 5. E.g. the drawing defined by the training example (which, like original drawing data received at 502 of method 500, is an ordered set of points)

is processed to generate an input vector (e.g. by standardisation as described at 508 and normalisation as described at 510) and that input vector is used as input to the model. In some examples each training example may already have been standardised and normalised (in which case standardisation and normalisation do not need to be performed again).

The classification determined by the model for a given training example is then compared to the actual template shape that the input shape is associated with in order to calculate a training example loss (and, ultimately, a total loss for the model in its current state). Different loss functions may be used. For example, where the output layer does not include a "no recognisable shape" class, Binary Cross Entropy loss may be used. Alternatively, if the output layer does include a "no recognisable shape" class, Categorical Cross Entropy loss may be used.

Training of the model may continue until a desired number of epochs is reached, or an early stopping condition is defined. As one example, an early stopping condition may be that the loss for the validation set starts to increase rather than decrease. Additional or alternative early stopping conditions may be defined.

If the desired number of epochs has not been reached and no early stopping condition exists, the model is trained using back propagation to calculate new model parameters (e.g. weights and biases).

Figure 9:
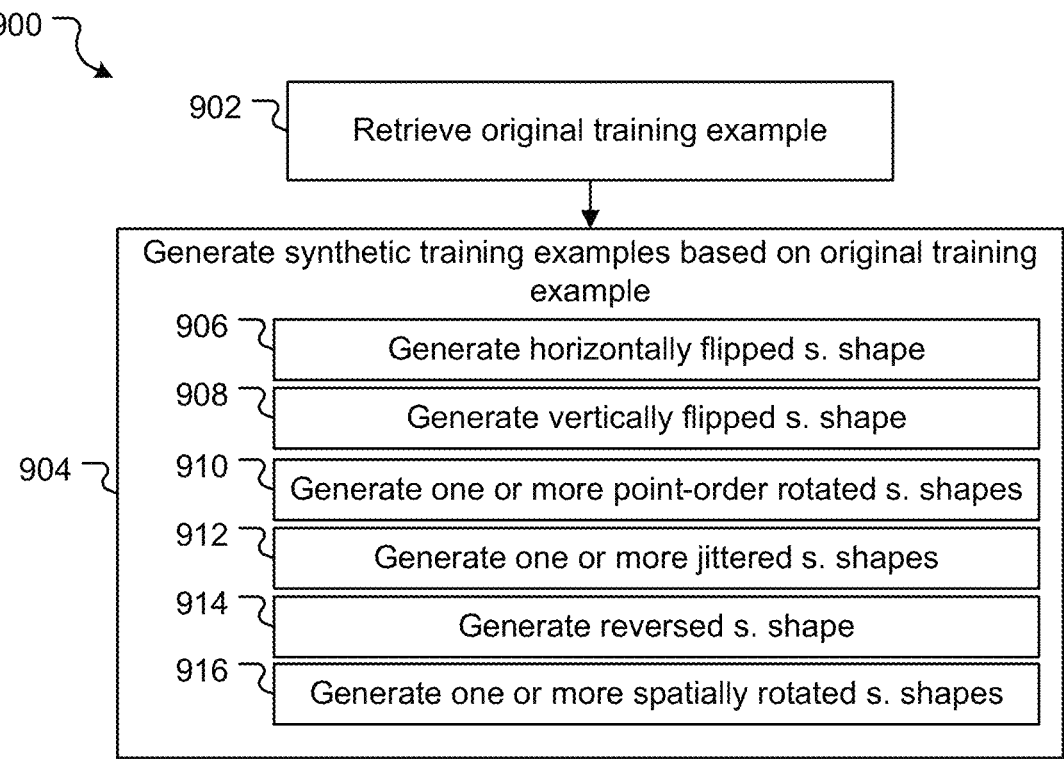
FIG. 9 is a flowchart depicting operations performed in an example method for generating a set of training examples.

As noted above, in order to train the machine learning model that is used at 512, a set of training examples is required. Turning to FIG. 9, a method 900 for generating a set of training examples will be described.

At 902, application 208 retrieves an original training example. This the original training example includes original drawing data (e.g. an ordered set of points) and an identifier of a template shape (or "no shape") that the original drawing data was intended to correspond to.

Application 208 may retrieve the original training example from any appropriate location—e.g. locally accessible memory (such as non-transitory memory 310 or a connected disk drive), a network accessible storage device or database, or any other location.

The original training example may be generated in various ways.

Figure 10:
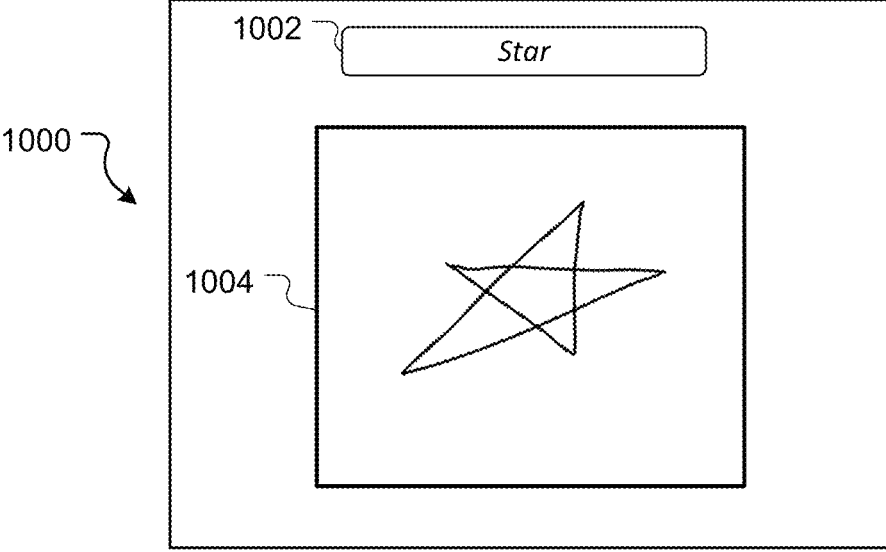
FIG. 10 depicts an example user interface.

In one embodiment, application 204 is configured to show a training example entry UI 1000 such as that shown in FIG. 10. UI 1000 includes a shape prompt 1002 and a page 1004. UI 1000 may also display a close or exit type control (not shown) which closes the UI.

Shape prompt 1002 displays the name of a template shape that a user is to draw on page 1002. Application 204 may automatically set the value of the shape prompt 1002 to a particular template shape and change this over time. For example, in FIG. 10 the template prompt displays "star" (indicating the user should draw a star shape). After a (or several) star shape(s) have been drawn, application 204 may change the shape prompt 1002 to prompt for a different shape (e.g. "Tick").

Alternatively, the shape prompt 1002 may be a control (such as a drop-down menu or other control) that allows a user to select a particular template shape that they wish to draw from a list of template shapes.

In order generate data that will help train the model to identify when an input shape does not correspond to any template shape, application may also use prompt 1002 to prompt a user to draw something that does not correspond to any template shape (e.g. a squiggle or other shape).

Page 1004 is similar to page 404 of editor UI 400 and allows a user to draw using a draw tool.

Application 204 may be configured so that once a user has finished a drawing a shape (detected, for example, when the user releases the mouse button or breaks contact with a touch screen display) that shape is automatically saved as an original training example. This involves saving the original drawing data (e.g. the ordered set of points that have been captured and describe the shape) and the particular template shape (or "no shape") as is displayed by the shape prompt 1002 while the shape is being drawn. Once a user draws a shape application 204 may also automatically clear the shape that has been drawn from the display (and, if necessary, change the value of the shape prompt) so a further shape can be drawn. This allows a user to draw multiple shapes quickly and easily.

In other embodiments, rather than automatically saving a shape once the user has finished drawing it application may display discard and submit controls. If the discard control is activated the drawn shape is discarded without saving, and if the submit control is activated the shape is saved (and cleared from the display).

Original training examples generated at application 204 may be communicated to application 208 (or to a data store accessible by application 208) in various ways. For example, application 204 may communicate original training examples (either in real time or batched) to application 208 (or to a data store accessible by application 206) via network 110.

At 904, application 208 generates a plurality of synthetic training examples based on the original training example retrieved at 902. Application 208 may generate a synthetic training example based on an original training example in various ways.

In the present embodiments, application 208 is configured to generate a synthetic shape for each synthetic training example. Each synthetic shape is based on the original drawing data of the original training example and, therefore, will end up being associated with the same template shape that the original training example is associated with. Application 208 may generate a synthetic shape by one or more of: horizontally flipping the original drawing data (indicated at 906); vertically flipping the original drawing data (indicated at 908); point-order rotating the original drawing data (indicated at 910); jittering the original drawing data (indicated at 912); reversing the original drawing data (indicated at 914); and/or spatially rotating the original drawing data (indicated at 916). Each of these will be described in turn.

To generate a horizontally flipped synthetic shape (indicated at 906), application 208 horizontally flips the shape described by the original drawing data and records the resulting drawing data (and the same template shape identifier of the original training example) as a synthetic training example.

To generate a vertically flipped synthetic shape (indicated at 908), application 208 vertically flips the shape described by the original drawing data and records the resulting drawing data (and the same template shape identifier of the original training example) as a synthetic training example. Application 208 may be configured to so that vertically flipped synthetic shapes are not generated for one or more shape types—e.g. so that vertical flipping is not applied to tick shapes.

To generate a point-order rotation synthetic shape (indicated at 910), application 208 rolls the points of the original drawing data (maintaining the original order) and records the resulting drawing data (and the same template shape identifier of the original training example) as a synthetic shape. For example, if the original drawing data included points (p1, p2, p3, p4) a point order rotation may result in data of (p2, p3, p4, p1). Generally speaking, for original drawing data that includes n points application 208 may generate up to n point-order rotations (each point-order rotation defining a different synthetic shape).

Application 208 may be configured to so that point-order rotation synthetic shapes are only applied to shapes in which the start and end point are the same or close together. For example, application 204 may be configured so that point-order rotation synthetic shapes are not generated for shapes such as ticks, lines, and arrows.

To generate a jittered synthetic shape (indicated at 912), application 208 applies a small random perturbation to one or more (typically each) point defined by the original drawing data and records the resulting drawing data (and the same template shape identifier of the original training example) as a synthetic shape. Application 208 may be configured to generate multiple jittered synthetic shapes (each with different perturbations applied) based on an original training example.

To generate a reversed synthetic shape (indicated at 914), application 208 reverses the order of the points of the original drawing data and records the resulting drawing data (and the same template shape identifier of the original training example) as a synthetic shape.

To generate a spatial-rotation synthetic shape (indicated at 916), application 208 applies a random rotation (e.g. between 0 and 180 decrees) to the shape described by the original drawing data and records the resulting drawing data as a synthetic shape. Application 208 may be configured to generate multiple spatial rotation examples synthetic shapes (each at a different rotation angle) based on an original training example.

Application 208 may be configured to enforce different rotation ranges for different shape types. For example, application 208 may restrict random rotations applied to square, diamond, and tick shapes to 10 degrees (on the basis that a square rotated by 45 degrees is a diamond, and ticks will typically be drawn in in a relatively upright manner).

In addition (or in alternative) to the above, application 208 may be configured to generate yet further synthetic shapes by combining two or more the techniques described. For example, application may create further synthetic shapes by generating one or more jittered synthetic shapes and then generating one or more spatial rotation synthetic shape for each jittered synthetic shape.

In certain embodiments, application 208 may further process each original training example and each synthetic training example that is created to generate and store a corresponding input vector. This may involve processing the drawing data of each training data according to the same (or similar) operations as those performed when recognising an input image (described above with reference to FIG. 5). E.g. an input vector for a given training example may be generated by standardising (e.g. as described at 508) and normalised (e.g. as described at 510) the training example drawing data.

Method 900 will typically be performed for multiple original training examples (including multiple original training examples for each template shape that is to be recognised). By generating training examples in this way, a large and complete set of training examples can be generated based on relatively few original training examples.

The following numbered clauses describe additional, specific embodiments of the disclosure:

Clause 1. A computer implemented method including:

receiving, via an input device, first user input drawing an input shape;

generating, based on the first user input, original drawing data, the original drawing data including an ordered set of points that define the input shape;

processing the original drawing data to generate an input vector, the input vector including an ordered set of points; and classifying the input shape into a first class that corresponds to a first template shape by processing the input vector using a machine learning model;

generating a new shape based on the first template shape and the original drawing data; and outputting the new shape.

Clause 2. The computer implemented method of clause 1, wherein processing the original drawing data to generate the input vector includes processing the original drawing data to generate first standardised drawing data, the first standardised drawing data including an ordered set of points and having a first defined number of points.

Clause 3. The computer implemented method of clause 2, wherein processing the original drawing data to generate the first standardised drawing data includes processing the original drawing data according a piecewise linear interpolation method.

Clause 4. The computer implemented method of clause 2, wherein processing the original drawing data to generate the first standardised drawing data includes processing the original drawing data according to a line standardisation method that includes:

performing one or more top level iterations, each top level iteration including processing the original drawing to determine a maximally distal point of the original drawing data; and adding the maximally distal point determined at each iteration to a result set; and on completion of the one or more top level iterations, generating the first standardised drawing data based on the result set.

Clause 5. The computer implemented method of clause 4, wherein the line standardisation method includes initialising a result set that identifies a plurality of original drawing data points, and wherein each top level iteration includes:

determining one or more line segments defined by the result set;

determining a distal point for each line segment, the distal point for a line segment associated with a segment maximum distance; and selecting the distal point that is associated with a maximum segment maximum distance as the maximally distal point.

Clause 6. The computer implemented method of clause 5, wherein determining the distal point for a selected line segment includes:

calculating, for each original drawing data point that falls within the selected line segment, a segment distance; and selecting the original drawing data point with the greatest segment distance as the distal point of the selected line segment.

Clause 7. The computer implemented method of clause 6, wherein calculating the segment distance for a selected original drawing data point that falls within the selected line segment includes calculating a perpendicular distance between the selected original drawing data point and the selected line segment.

Clause 8. The computer implemented method of any one of clauses 4 to 7, wherein performing one or more top level iterations includes performing $N-2$ iterations, where N is equal to the first defined number of points.

Clause 9. The computer implemented method of any one of clauses 2 to 8, wherein processing the original drawing data to generate an input vector includes normalising the first standardised drawing data.

Clause 10. The computer implemented method of any one of clauses 1 to 8, wherein processing the original drawing data to generate an input vector includes normalising the original drawing data.

Clause 11. The computer implemented method of any one of clauses 1 to 10, wherein generating the new shape based on the first template shape includes one or more of translating, rotating, and stretching the first template shape.

Clause 12. The computer implemented method of clause 11, whether generating the new shape further includes:

processing the original drawing data to generate second standardised drawing data, the second standardised drawing data including an ordered set of points and having a second defined number of points; and processing the template shape data to generate standardised template data, the standardised template data including an ordered set of points and having the second defined number of points.

Clause 13. The computer implemented method of clause 11 or clause 12, wherein generating the new shape includes:

determining a set of test rotation values;

for each test rotation value, performing a test that includes:

generating a test shape by translating, rotating and stretching the first template shape; and calculating a dissimilarity score for the test shape, the dissimilarity score being a measure of dissimilarity between the input shape and the test shape; and generating the new shape based on the test shape associated with the most favourable dissimilarity score.

Clause 14. The computer implemented method of clause 13, wherein generating the new shape includes: performing a first test corresponding to a first test rotation value, the first test including: generating a first test shape by translating, rotating and stretching the first template shape; and calculating a dissimilarity score for first the test shape.

Clause 15. The computer implemented method of clause 14, wherein generating the first test shape includes translating the first template shape by:

calculating an input shape centroid;

calculating a template shape centroid; and translating the template shape so that the template shape centroid equals the input shape centroid.

Clause 16. The computer implemented method of clause 15, wherein:

the input shape centroid is calculated based on the second standardised drawing data;

the template shape centroid is calculated based on the standardised template data.

Clause 17. The computer implemented method of any one of clauses 14 to 16, wherein generating the first test shape includes:

rotating the first template shape by the first test rotation value; and stretching the first template shape in two orthogonal directions.

Clause 18. The computer implemented method of clause 17, wherein stretching the first template shape in two orthogonal directions includes stretching the first template shape so a variance of the first template shape matches a variance of the input shape.

Clause 19. The computer implemented method of any one of clauses 14 to 18, wherein performing the first test further includes:

generating a plurality of test shape variants, each test shape variant based on the first test shape;

calculating a dissimilarity sub-score for each of the test shape variants, the dissimilarity sub-score for a selected test shape variant being a measure of dissimilarity between the input shape and the test shape variant;

and wherein generating the new shape based on the test shape associated with the most favourable dissimilarity score includes generating the new shape based on the test shape variant with the most favourable dissimilarity sub-score.

Clause 20. The computer implemented method of clause 19, wherein generating the plurality of test shape variants based on the first test shape includes generating a first variant by one of: reflecting the point order of the first test shape; point-order rotating the first test shape.

Clause 21. A computer implemented method including:

receiving original drawing data including an ordered set of input drawing points that define an input shape;

processing the original drawing data to generate an input vector, the input vector defining an ordered set of input vector points; and classifying the input shape into a first class that corresponds to a first template shape by processing the input vector using a machine learning model Clause 22. The computer implemented method of clause 21, wherein receiving original drawing data includes:

receiving, via an input device, first user input drawing the input shape; and processing the first user input to generate the original drawing data.

Clause 23. The computer implemented method of clause 21 or clause 22, further including: generating a new shape based on the first template shape; and outputting the new shape.

Clause 24. A computer implemented method for standardising a number of points used to define a shape, the method including:

receiving original drawing data including an ordered set of original drawing points that define an input shape;

determining that the number of original drawing points exceeds a defined number of points; and in response to determining that the number of original drawing points exceeds the defined number of points, processing the drawing data to generate standardised drawing data by:

performing one or more top level iterations, each top level iteration including processing the original drawing to determine a maximally distal point; and adding the maximally distal point determined at each iteration to the standardised drawing data.

Clause 25. The computer implemented method of clause 24, wherein:

processing the original drawing data to generate standardised drawing data includes initialising a result set to identify a plurality of original drawing data points; and each top level iteration includes:

determining one or more line segments defined by the result set;

determining a distal point for each line segment, the distal point for a line segment associated with a segment maximum distance; and selecting the distal point that is associated with a maximum segment maximum distance as the maximally distal point for the top level iteration.

Clause 26. The computer implemented method of clause 25, wherein initialising a result set to identify the plurality of original drawing data points includes initialising a result set to identify a first original drawing data point and a last original drawing data point.

Clause 27. The computer implemented method of clause 25 or clause 26 wherein each line segment defined by the result set is defined by a pair of original drawing data points.

Clause 28. The computer implemented method of any one of clauses 25 to 27, wherein determining the distal point for a selected line segment includes:

calculating, for each original drawing data point that falls within the selected line segment, a segment distance; and selecting the original drawing data point with the greatest segment distance as the distal point of the selected line segment.

Clause 29. The computer implemented method of clause 28, wherein calculating the segment distance for a selected original drawing data point that falls within the selected line segment includes calculating a perpendicular distance between the selected original drawing data point and the selected line segment.

Clause 30. The computer implemented method of any one of clauses 24 to 29, wherein performing the one or more top level iterations includes performing N−2 iterations, where N is equal to the defined number of points.

Clause 31. A computer implemented method for generating a set of training examples, each training example including an ordered set of points and being associated with a template shape, the method including:

retrieving original drawing data, the original drawing data including an ordered set of original data points that define an input shape, the input shape being associated with a first template shape; and generating the set of training examples by:

generating a plurality of synthetic shapes, each synthetic shape being based on the original drawing data; and recording each synthetic shape as a training example associated with the first template shape.

Clause 32. The computer implemented method of clause 32, wherein generating the plurality of synthetic shapes includes generating a first synthetic shape by horizontally flipping the original drawing data.

Clause 33. The computer implemented method of clause 31 or clause 32, wherein generating the plurality of synthetic shapes includes generating a second synthetic shape by vertically flipping the original drawing data.

Clause 34. The computer implemented method of any one of clauses 31 to 33, wherein generating the plurality of synthetic shapes includes generating a third synthetic shape by point-order rotating the original drawing data.

Clause 35. The computer implemented method of any one of clauses 31 to 34, wherein generating the plurality of synthetic shapes includes generating a fourth synthetic shape by randomly perturbing one or more of the original data points.

Clause 36. The computer implemented method of any one of clauses 31 to 35, wherein generating the plurality of synthetic shapes includes generating a fifth synthetic shape by reversing the original drawing data.

Clause 37. The computer implemented method of any one of clauses 31 to 36, wherein generating the plurality of synthetic shapes includes generating a sixth synthetic shape by applying a spatial rotation to the original drawing data.

Clause 38. The computer implemented method of any one of clauses 31 to 37, wherein retrieving the original drawing data includes:

receiving, via an input device, first user input drawing the input shape; and generating, based on the first user input, the original drawing data.

Clause 39. The computer implemented method of clause 38, further including causing a user interface to be displayed, the user interface including a drawing area on which the input shape may be drawn and a prompt that indicates the first template shape.

Clause 40. A computer processing system including:

a processing unit; and a non-transitory computer-readable storage medium storing instructions, which when executed by the processing unit, cause the processing unit to perform a method according to any one of clauses 1 to 39.

Clause 41. A non-transitory storage medium storing instructions executable by processing unit to cause the processing unit to perform a method according to any one of clauses 1 to 39.

Where application 204 is described as displaying user interfaces (or user interface elements such as controls and other UI objects), application 204 does so via one or more displays—e.g. display 318. Where application 204 operates to receive or detect user input, such input is provided via one or more input devices—e.g. a touch screen, a touch screen display 318, a cursor control device 324, a keyboard 326, and/or an alternative input device.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

Unless otherwise stated, the terms "include" and "comprise" (and variations thereof such as "including", "includes", "comprising", "comprises", "comprised" and the like) are used inclusively and do not exclude further features, components, integers, steps, or elements.

In some instances the present disclosure may use the terms "first," "second," etc. to identify and distinguish between elements or features. When used in this way, these terms are not used in an ordinal sense and are not intended to imply any particular order. For example, a first user input could be termed a second user input or vice versa without departing from the scope of the described examples. Furthermore, when used to differentiate elements or features, a second user input could exist without a first user input or a second user input could occur before a first user input.

Background information described in this specification is background information known to the inventors. Reference to this information as background information is not an acknowledgment or suggestion that this background information is prior art or is common general knowledge to a person of ordinary skill in the art.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for generating a new shape based on a template shape and an input shape, wherein:

the template shape is defined by template shape data that includes an ordered set of template shape points;

the ordered set of template shape points has a defined number of template shape points;

the input shape is defined by input shape data that includes an ordered set of input shape points;

the ordered set of input shape points has the defined number of input shape points; and the method includes:

receiving original shape data that includes an ordered set of original shape points, wherein the ordered set of original shape points has a first number of original shape points, the first number being different to the defined number;

processing, by a processing unit, the original shape data to generate the input shape data that has the defined number of input shape points;

determining a plurality of test rotation values;

for each test rotation value in the plurality of test rotation values, performing a test that includes:

generating a test shape based on the template shape and the test rotation value; and calculating a dissimilarity score for the test shape, the dissimilarity score being a measure of dissimilarity between the input shape and the test shape;

determining, based on the dissimilarity scores, a particular test shape that most closely matches the input shape; and generating the new shape based on the particular test shape.

2. The computer implemented method of claim 1, wherein generating the new shape includes:

performing a first test corresponding to a first test rotation value of the plurality of test rotation values, the first test including:

generating a first test shape by rotating the template shape according to the first test rotation value; and calculating a first dissimilarity score for the first test shape.

3. The computer implemented method of claim 2, wherein generating the first test shape further includes translating the template shape.

4. The computer implemented method of claim 2, wherein generating the first test shape further includes translating the template shape by:

calculating an input shape centroid;

calculating a template shape centroid; and translating the template shape so that the template shape centroid equals the input shape centroid.

5. The computer implemented method of claim 2, wherein generating the first test shape further includes stretching the template shape.

6. The computer implemented method of claim 2, wherein generating the first test shape further includes stretching the template shape in two orthogonal directions.

7. The computer implemented method of claim 6, wherein stretching the template shape in two orthogonal directions includes stretching the template shape so an x-coordinate variance of the stretched template shape matches an x-co-ordinate variance of the input shape and a y-coordinate variance of the stretched template shape matches a y-coor-dinate variance of the input shape.

8. The computer implemented method of claim 2, wherein performing the first test further includes:

generating a plurality of test shape variants, each test shape variant based on the first test shape;

calculating a dissimilarity sub-score for each of the test shape variants, the dissimilarity sub-score for a selected test shape variant being a measure of dissimilarity between the input shape and the selected test shape variant;

and wherein generating the new shape based on the particu-lar test shape includes:

determining, based on the dissimilarity sub-scores, a particular test shape variant that most closely matches the input shape; and generating the new shape based on the particular test shape variant.

9. The computer implemented method of claim 8, wherein generating the plurality of test shape variants based on the first test shape includes generating a first variant by point-order rotating the first test shape.

10. The computer implemented method of claim 1, wherein the first number is greater than the defined number.

11. The computer implemented method of claim 1, further including processing a vector graphic to generate the tem-plate shape data.

12. The computer implemented method of claim 11, wherein processing the vector graphic to generate the tem-plate shape data includes generating a linear approximation of the vector graphic.

13. A computer processing system including:

a processing unit; and a non-transitory computer-readable storage medium stor-ing instructions, which when executed by the process-ing unit, cause the processing unit to perform a method for generating a new shape based on a template shape and an input shape, wherein:

the template shape is defined by template shape data that includes an ordered set of template shape points;

the ordered set of template shape points has a defined number of template shape points;

the input shape is defined by input shape data that includes an ordered set of input shape points;

the ordered set of input shape points has the defined number of input shape points; and the method includes:

receiving original shape data that includes an ordered set of original shape points, wherein the ordered set of original shape points has a first number of original shape points, the first number being dif-ferent to the defined number;

processing the original shape data to generate the input shape data that has the defined number of input shape points;

determining a plurality of test rotation values;

for each test rotation value in the plurality of test rotation values, performing a test that includes:

generating a test shape based on the template shape and the test rotation value; and calculating a dissimilarity score for the test shape, the dissimilarity score being a measure of dis-similarity between the input shape and the test shape;

determining, based on the dissimilarity scores, a particular test shape that most closely matches the input shape; and generating the new shape based on the particular test shape.

14. The computer processing system of claim 13, wherein generating the new shape includes:

performing a first test corresponding to a first test rotation value of the plurality of test rotation values, the first test including:

generating a first test shape by rotating the template shape according to the first test rotation value; and calculating a first dissimilarity score for the first test shape.

15. The computer processing system of claim 14, wherein generating the first test shape further includes translating the template shape.

16. The computer processing system of claim 13, wherein the method further includes processing a vector graphic to generate the template shape data.

17. A non-transitory storage medium storing instructions executable by processing unit to cause the processing unit to perform a method for generating a new shape based on a template shape and an input shape, wherein:

the template shape is defined by template shape data that includes an ordered set of template shape points;

the ordered set of template shape points has a defined number of template shape points;

the input shape is defined by input shape data that includes an ordered set of input shape points;

the ordered set of input shape points has the defined number of input shape points; and the method includes:

receiving original shape data that includes an ordered set of original shape points, wherein the ordered set of original shape points has a first number of original shape points, the first number being different to the defined number;

processing the original shape data to generate the input shape data that has the defined number of input shape points;

determining a plurality of test rotation values;

for each test rotation value in the plurality of test rotation values, performing a test that includes:

generating a test shape based on the template shape and the test rotation value; and calculating a dissimilarity score for the test shape, the dissimilarity score being a measure of dissimilarity between the input shape and the test shape;

determining, based on the dissimilarity scores, a particular test shape that most closely matches the input shape; and generating the new shape based on the particular test shape.

18. The non-transitory storage medium of claim 17, wherein generating the new shape includes:

performing a first test corresponding to a first test rotation value of the plurality of test rotation values, the first test including:

generating a first test shape by rotating the template shape according to the first test rotation value; and calculating a first dissimilarity score for the first the test shape.

19. The non-transitory storage medium of claim 18, wherein generating the first test shape further includes translating the template shape.

20. The non-transitory storage medium of claim 17, wherein the method further includes processing a vector graphic to generate the template shape data.

* * * * *